United States Patent [19]

Maus et al.

[11] Patent Number: 5,340,020

[45] Date of Patent: Aug. 23, 1994

[54] METHOD AND APPARATUS FOR GENERATING HEAT BY FLAMELESS COMBUSTION OF A FUEL IN A GAS FLOW

[75] Inventors: Wolfgang Maus; Helmut Swars, both of Bergisch Gladbach; Heinrich Pütz, Much; Walter Jäger, Engelskirchen, all of Fed. Rep. of Germany

[73] Assignee: Emitec Gesellschaft fuer Emissiontechnologie mbH, Lohmar, Fed. Rep. of Germany

[21] Appl. No.: 807,169

[22] Filed: Dec. 13, 1991

Related U.S. Application Data

[63] Continuation of PCT/EP90/00966, Jun. 19, 1990.

[30] Foreign Application Priority Data

Jun. 20, 1989 [DE] Fed. Rep. of Germany ....... 3920159
Nov. 7, 1989 [DE] Fed. Rep. of Germany ... 8913184[U]
Mar. 8, 1990 [DE] Fed. Rep. of Germany ... 9002743[U]

[51] Int. Cl.$^5$ ............................................... B60H 1/02
[52] U.S. Cl. .................................. 237/12.3 C; 431/7; 431/116
[58] Field of Search ............................... 34/26, 32, 79; 237/12.3 C; 431/7, 11, 12, 115, 116

[56] References Cited

U.S. PATENT DOCUMENTS

| | | |
|---|---|---|
| 1,789,812 | 1/1931 | Frazer . |
| 3,314,159 | 4/1967 | Betz . |
| 3,699,683 | 10/1972 | Tourtellotte et al. . |

FOREIGN PATENT DOCUMENTS

| | | |
|---|---|---|
| 0121174 | 10/1984 | European Pat. Off. . |
| 0049489 | 6/1985 | European Pat. Off. . |
| 0121175 | 1/1987 | European Pat. Off. . |
| 0245737 | 11/1987 | European Pat. Off. . |
| 0245738 | 11/1987 | European Pat. Off. . |
| 0287923 | 10/1988 | European Pat. Off. . |
| 563757 | 10/1932 | Fed. Rep. of Germany . |
| 2230663 | 12/1972 | Fed. Rep. of Germany . |
| 2251631 | 5/1973 | Fed. Rep. of Germany . |
| 3716187 | 11/1987 | Fed. Rep. of Germany . |
| 3835939 | 5/1989 | Fed. Rep. of Germany . |
| 58115216 | 7/1981 | Japan . |
| 775549 | 5/1957 | United Kingdom . |
| 2074889 | 11/1981 | United Kingdom . |

OTHER PUBLICATIONS

Ashrae Journal, vol. 15, No. 5, May 1973, New York, pp. 43-45; John E. Yocom: "Incineration of Gases & Vapors" p. 44, r. col. last par.-p. 45 left col. last par. & Fig. 2 are pertinent.

*Primary Examiner*—Henry A. Bennet
*Attorney, Agent, or Firm*—Herbert L. Lerner; Laurence A. Greenberg

[57] ABSTRACT

A method for generating heat by flameless combustion of a fuel in a gas flow having an oxygen content, includes passing a gas flow through at least one heating device, along at least one delivery device for fuel, and along at least one catalytically active element. A predominant part of the gas flow is passed through a loop while passing through a feed apparatus and along the at least one catalytically active element. A gas having an oxygen content is fed into the loop, and some of the gas flow is discharged from the loop. Fuel is admixed with the gas flow only to such an extent that a resultant fuel-gas mixture is not itself ignitable. An apparatus for introducing heat into a component, includes a gas carrying system for conducting a gas flow carrying heat produced by flameless combustion of a fuel. The gas carrying system has at least one loop, a delivery device for delivering fuel, a gas inlet, and a gas outlet. Disposed in the loop are a component for heat absorption from the gas flow flowing around and/or through the component, a feed device for maintaining the gas flow in the loop, a heating device, and a catalytically active element.

33 Claims, 3 Drawing Sheets

METHOD AND APPARATUS FOR GENERATING HEAT BY FLAMELESS COMBUSTION OF A FUEL IN A GAS FLOW

CROSS-REFERENCE TO RELATED APPLICATION

This application is a Continuation of International Application Serial No PCT/EP90/00966, filed Jun. 19, 1990.

The invention relates to a method for generating heat by flameless combustion or burning of a fuel in an oxygen-containing gas flow or current, and to an apparatus for carrying out the method, in which the heat generated upon the combustion is to be introduced into a component through and/or around which the gas flow can flow.

Corresponding methods and apparatuses have manifold applications, specifically for heating heat transfer medium fluids such as water or air in heating systems for motor vehicles, for heating large indoor spaces or the like, and for heating honeycomb bodies in motor vehicle exhaust gas systems that are provided with catalytically active coatings to convert toxic exhaust substances into harmless substances.

Heating devices for motor vehicles, including in particular auxiliary or supplementary heaters, are known in many forms, for instance as disclosed in Published European Application No. 0 287 923 A2 and German Published, Non-Prosecuted Application DE 37 16 187 A1. Heating devices of that kind generally have configurations for generating heat by burning a fluid fuel and moreover are provided with heat exchangers in which the heat generated in the burning is transferred to a heat transfer medium fluid such as air or water. Published European Application No. 0 287 923 A2 proposes carrying the exhaust gases, that are created in conventional combustion, through a catalytically active matrix for cleaning before discharging them into the open air. German Published, Non-Prosecuted Application DE 37 16 187 A1 proposes burning the fuel at least partly in a catalytically effected flameless reaction. To that end, the fuel is admixed with an airflow, and the mixture is carried through a catalytically active matrix. Located downstream of the catalytically active matrix is a heat exchanger, in which the heat generated in the burning is transferred to a heat transfer fluid, whereupon the gas flow leaves the apparatus.

Published British Application GB 2 074 889 A relates to the furnishing of a hot gas flow for heat-treating foodstuffs, wherein the hot gas flow is formed by passing an oxygen-containing gas flow that is mixed with a fuel along a catalyst, where fuel and oxygen react with another exothermically. In order to preheat the oxygen-containing gas flow, a fraction of the gas flow can be drawn off at a tapping point, mixed with fuel, carried through a second catalyst for converting the fuel, and finally resupplied to the gas flow upstream of the tapping point. In that way, an otherwise necessary different, and in particular electrical, kind of preheating of the gas flow that would have to be operated permanently, is intended to be made dispensable. In general, the primary heating of the gas flow takes place in a single trip through the first-mentioned catalyst. Recirculation of the gas flow takes place at most to the extent of a fraction, in order to preheat the overall gas flow upstream of the actual catalyst.

U.S. Pat. No. 3,314,159 relates to the removal of solvent vapors from a drying oven serving to dry paints. An apparatus is described therein in which the solvent vapors are burning catalytically in an oxygen-containing gas flow. The exhaust gases from the flameless combustion are used as carbon-dioxide-rich gases for diluting and preheating the solvent vapors and are recirculated with the vapors fractionally. The oxygen required for burning the vapors is furnished by a continuous delivery of fresh air. The generation of heat is not an essential purpose of the apparatus according to U.S. Pat. No. 3,314,159, because that apparatus contains a drying oven heated by other sources as its main heat source. The partial recirculation of the exhaust gases from the catalytic combustion is used to dilute the solvent vapors. An essential characteristic of the apparatus described therein is also that all of the reactable ingredients of the gases flowing to the catalyst, and in particular the solvent vapors and the oxygen, are completely converted in a single trip through the catalyst, so that contamination of the exhaust gases discharged from the apparatus is reduced, and so that the mixture of solvent vapors and exhaust gases also does not remain ignitable.

German Published, Non-Prosecuted Application DE 38 35 939 A1 relates to the heating of a honeycomb body for treating the exhaust gases in a motor vehicle, wherein the honeycomb body is acted upon by a hot gas flow. Heating of the gas flow takes place by catalytic combustion of a fuel that is admixed with the gas flow before the gas flow flows through the exhaust gas catalyst or through some further catalytically active element. The gas flow downstream of the exhaust gas catalyst can also be carried through a heat exchanger, so that the heat remaining in the gas flow can be transferred to a further heat transfer medium for heating the motor vehicle interior and/or the motor vehicle coolant.

If a catalytically active element is to be able to develop its catalytic effect, its temperature must exceed a certain limit temperature, which is the so-called "activation temperature" or the onset or start-up temperature of the catalytic reaction. Noble metals such as platinum, rhodium or palladium that are typically used as catalysts, like known catalytically active compounds, have activation temperatures of around 200° C. or more. Accordingly, it is necessary to preheat a catalytically active element. In the combustion systems mentioned above, that requires preheaters which permit heating of the catalytically active elements to adequately high temperatures. Such preheaters may, for instance, be electrical heaters of an arbitrary kind. Proposals accordingly can be found in German Published, Non-Prosecuted Application DE-OS 22 51 631. German Patent DE-PS 563 757 moreover proposes direct electrical heating of a metal carrier body, which has catalytic material applied thereto.

Carrier bodies that are provided with coatings of catalytically active materials and are excellently suitable as catalytically active elements are also known in great numbers. For example, reference is made to European Patent Nos. 0 049 489 B1; 0 121 174 B1 and 0 121 175 B1, as well as Published European Application Nos. 0 245 737 A1 and 0 245 738 A1, corresponding to U.S. Pat. Nos. 4,803,189; 4,832,998; 4,923,109; and 4,946,822.

All of the proposals and the prior art for flameless burning of a fuel in a catalytically active element have one substantial deficiency: Upon reaching the catalytically active element, the gas flow is typically at a relatively low temperature, namely essentially the temperature of the surroundings of the apparatus from which it was drawn. A considerable portion of the heat of combustion generated in the catalytically active element must therefore be employed to heat the cold gas flow to an adequately high temperature, before the combustion reaction can even ensue. However, that means that the reaction in the catalytically active element becomes unstable as soon as the air mass flow rate of the gas flow exceeds a certain threshold. In particular, a danger exists that the catalyst, in its inflow region, that is the region first touched by the gas flow, will cool down so extensively that the catalytic reaction comes to a stop. A certain "dead zone" can accordingly result, which may spread over the entire catalytically active element, depending on the mass flow rate and temperature of the gas flow, so that the reaction fails completely. In summary, it can be said that previously known methods for flameless combustion of a fuel in a gas flow are suitable for generating heat in only a limited output range, one which in particular is severely restricted at the top.

It is accordingly an object of the invention to provide a method and apparatus for generating heat by flameless combustion of a fuel in a gas flow, which overcome the hereinafore-mentioned disadvantages of the heretofore-known methods and devices of this general type and which improve the generation of heat by flameless combustion of a fuel in a gas flow in such a way that the combustion reaction is stable and has an adequately wide adjusting range for the thermal output for practical use.

With the foregoing and other objects in view there is provided, in accordance with the invention, a method for generating heat by flameless combustion of a fuel in a gas flow having an oxygen content, which comprises passing a gas flow through at least one heating device, along at least one delivery device for fuel, and along at least one first catalytically active element; passing a predominant part of the gas flow through a loop while passing through a first feed apparatus and along the at least one first catalytically active element; feeding a gas having an oxygen content into the loop, and discharging some of the gas flow from the loop; and admixing fuel with the gas flow only to such an extent that a resultant fuel-gas mixture is not itself ignitable.

One essential element of the invention is that the gas flow is predominantly carried in a loop that includes not only the catalytically active element but also a feed device for maintaining the gas flow in the loop. In the loop, some of the gas flow flowing out of the catalytically active element is returned to the inflow side of the catalytically active element again. Since the temperature of the outflowing gas flow is relatively high because of the combustion, the gas flow component carried in the loop causes an increase in the temperature of the gas flow flowing to the catalytically active element. This prevents the region of the catalytically active element that experiences the inflow of the gas flow from cooling down too severely, and it precludes the creation of dead zones. Moreover, suitably selecting the proportion being recirculated makes for a substantially uniform utilization of the catalytically active element over its entire length. The proportion of the heat of combustion that has to be employed for heating the fuel-containing gas flow to and above the activation temperature of the catalyst, is also reduced sharply. The result is a considerable widening of the adjustment range for the thermal output being generated, without having to accept substantial sacrifices in thermal efficiency.

As compared with the methods that are possible in the prior art, the operating conditions of the method according to the invention can be defined for the first time without taking the heat transport in the catalytically active element into account. The mass flow rate of a gas flow at ambient temperature flowing to the catalytically active element must remain below a critical variable, which is determined from the magnitude of the heat transport to the inflow side of the catalytically active element. If the gas flow flowing to the catalytically active element is adequately preheated, as is possible with the invention, this limit can be shifted to higher flow rates, and possibly even up to magnitudes beyond practical applicability. This permits a mode of operation in which the fuel-to-oxygen ratio in the gas flow is kept at a constant value regardless of the thermal output required, and the thermal output is merely regulated through the mass flow rate of the gas flow. The temperature of the gas flow as it flows to the catalytically active element remains at an adequately high value, because of the recirculation through the loop, so that the combustion reaction can be kept entirely stable.

In accordance with another mode of the invention, there is provided a method which comprises carrying the predominant portion of the gas flow, for instance up to a proportion of approximately 70% to approximately 90%, in the loop. Accordingly, a substantially circulating gas flow is present, in which fuel and air (or other oxygen-containing gas) can be fed as needed, and from which gas can be discharged as needed, for instance for pressure limitation. The advantages of thermal storage in the gas flow are fully exploitable, particularly to maintain an adequately high operating temperature of the catalytically active element. In order to avoid excess thermal loads, the temperature of the gas flow can be limited by thermal decoupling in the loop, and in particular can be kept at a temperature in the range of the activation temperature of the catalytically active element. Once the system used to carry out the method has attained its operating temperature, the generation of heat to maintain this operating temperature is necessary only to the extent that the removal of heat has to be compensated for.

A particularly advantageous property of the method according to the invention is also that the delivery of fuel to the gas flow is kept so low at all times that the resultant fuel-gas mixture is not self-ignitable, and in particular is not explosive. As already mentioned, the temperature of the gas flow as it flows into the catalytically active element can be kept adequately high by the recirculation in the loop, largely independently of its flow speed and thus of the mass flow rate. Correspondingly, the mass flow rate of the gas flow can be adapted substantially freely to the quantity of fuel delivered, which determines the thermal output. In particular, the mixture ratio of fuel and oxygen in the gas flow can be kept constant, and preferably constantly lean. Practically completely safe operation thus becomes possible.

In accordance with a further mode of the invention, there is provided a method which comprises initially heating the gas flow with the heating device at least as long as the temperature of the gas flow is below an activation or light-off temperature of the at least one first catalytically active element.

The method according to the invention is advantageously carried out in such a way that before the catalytic reaction ensues, the gas flow carried in the loop is heated by a heating device, which is preferably electrically operated, until its temperature attains the activation temperature of the catalytically active element, or until the catalytically active element is adequately heated. Further provisions for initiating combustion, such as special pilot burners or electric spark plugs, are unnecessary.

In accordance with an added mode of the invention, there is provided a method which comprises preventing gas from being fed into the loop as long as the gas flow is being heated. When the method is carried out, the feeding of oxygen-containing gas into the circulating gas flow can advantageously be omitted, once a gas flow having an adequate oxygen content has been built up. Also it is unnecessary to add fuel continuously before combustion ensues. It is entirely adequate for the gas flow to be mixed a single time with a small quantity of fuel, since the catalytic combustion does not require a special mixture ratio of fuel and oxygen. The oxygen-containing gas flow, mixed with fuel, is merely heated by the heating device until the catalytically active element has attained a temperature at which the catalyst is activated, due to heat transfer and/or direct preheating. The actuation of the method according to the invention is thus entirely safe in every phase, since high concentrations of fuel, with the associated danger of misfiring, are avoided.

In accordance with an additional mode of the invention, there is provided a method which comprises feeding gas into the loop only while ensuring that the temperature of the gas flow upon reaching the at least one catalytically active element is not below an activation temperature of the at least one catalytically active element.

Accordingly, feeding of fresh, oxygen-containing gas into the loop is advantageously limited in such a way that the temperature of the gas flow upon reaching the catalytically active element does not drop below the activation temperature of the element. This possibility is always available with the method according to the invention. Its advantages intrinsically result primarily whenever the method is carried with a constantly lean fuel-air mixture.

In accordance with yet another mode of the invention, there is provided a method which comprises controlling the discharge of gas from the gas flow carried in the loop, regardless of other features of the method, in such a way that a discharge takes place only whenever the gas pressure in the loop exceeds a certain limit value. Through the use of combustion with a high oxygen excess, multiple recirculation of the gas flow is possible without losing the good properties of the method, among which is the markedly low emission of pollutants from the flameless combustion. The only consequence of heating the gas flow is an increase in the internal pressure, which must be counteracted by the discharge of gas. The discharge can be performed by means of suitable valves, in particular automatic overpressure safety valves. Under some circumstances, the pressure adjustment can also be performed by purely hydraulic measures, for instance by constructing the gas outlet that serves to effect the discharge as a tie line having an adequately small hydraulic cross section.

A particular field of application of the method according to the invention is the generation of thermal energy for heating purposes. In particular, the invention relates to portable and mobile heating systems, such as heating blowers for warehouses or the like, and heating devices for motor vehicles. Therefore, in accordance with yet a further mode of the invention, there is provided a method which comprises generating thermal energy at a maximum thermal output of approximately 10 kilowatts, in particular up to approximately 7 kilowatts, and preferably in the region of 4 kilowatts.

In accordance with yet an added mode of the invention, there is provided a method which comprises applying the method of the invention for introducing the heat generated in the gas flow into a component, around and/or through which the gas can flow, namely one or more heat exchangers and/or one or more exhaust gas catalysts.

With the objects of the invention in view, there is also provided an apparatus for introducing heat produced by flameless combustion of a fuel in a gas flow, into a component intended for heat absorption, around and/or through which the gas flow can flow, comprising a gas carrying system for conducting a gas flow carrying heat produced by flameless combustion of a fuel, the gas carrying system having at least one loop, a delivery device for delivering fuel, a gas inlet, a gas outlet and the component; the component being disposed in the loop for heat absorption from the gas flow flowing around and/or through the component, a first feed device disposed in the loop for maintaining the gas flow in the loop, a heating device disposed in the loop, and a first catalytically active element disposed in the loop.

An apparatus having these characteristics is excellently suitable for use as a portable or mobile heating system, for example as an auxiliary or supplementary heating system for a motor vehicle or as a portable heating system to heat large indoor spaces. It is also possible, because of the relatively low operating temperatures resulting from the flameless combustion, to use inexpensive materials for the structure, without having to make sacrifices in terms of service life and loading capacity.

The disposition of the delivery device for the fuel is relatively uncritical. It can be disposed in the gas inlet, so that fuel delivery into the gas flow is possible only together with a certain quantity of fresh gas. A deficiency of oxygen in the gas flow carried in the loop, which would have to cause the production of toxic substances such as carbon monoxide in the combustion, is thereby avoided. However, it may also be appropriate to dispose the delivery device in such a way that fuel is injected directly into the loop. In this way, the gas flow can be carried in the loop at least for some time without feeding fresh gas, which is especially important with a view to avoiding heat leakage particularly at low thermal outputs. Naturally it is necessary in that case to avoid the occurrence of an oxygen deficiency, by suitable monitoring measures.

According to the invention, the component into which the heat of combustion is to be introduced is part of the loop. Advantageously, it can be included in the system already mentioned above in order to regulate the temperatures in the gas flow. The component draws heat from the gas flow in any case and it may be dimensioned in such a way that the temperature of the gas flow, once it has flowed through the component, is at a temperature level in the range of the activation temperature of the catalytically active element. The method according to the invention, with practically complete recirculation of the gas flow in the loop, with all of the associated advantages, can be achieved in this way.

In accordance with another feature of the invention, there is provided another component disposed in the gas outlet for heat absorption.

It is also highly conceivable and also highly advantageous to place a component in both the loop and the gas outlet. In certain applications this can have additional advantages.

In accordance with a further feature of the invention, the first catalytically active element that effects the flameless combustion is part of the heating device. This feature of the apparatus according to the invention can be used in addition to other features. Accordingly, the apparatus has an essentially directly and immediately heatable first catalytically active element. When this apparatus is put into operation, which is to be carried out in the manner described above by preheating the gas flow by means of the heating device, the first catalytically active element is heated directly and can therefore reach its activation temperature especially quickly. If this is the case, then the flameless combustion ensues and furnishes additional energy for heating the gas flow and the other parts of the apparatus. The requirement for heating energy to be brought in from outside the apparatus that is necessary for carrying out the method can be reduced considerably in this way, which is especially important with a view to possible applications in motor vehicles.

In accordance with an added feature of the invention, the heating device itself has a heat conductor configuration that can be acted upon by an electric current. The electric heating is one simple and clean option and is thus superior to other heating devices such as conventional burners.

As a rule, gas is not fed automatically into the apparatus but instead some means of feeding fresh gas must be provided. This feed option can be provided by a suitably constructed first feed device in the loop. Otherwise, in accordance with an additional feature of the invention, there is provided a second feed device disposed in the gas inlet to deliver fresh gas to the loop.

It is also advantageous to provide the apparatus according to the invention with sensors for monitoring operation. Lambda sensors for determining the composition of the circulating gas flow and thermocouples for monitoring the operating temperatures are especially advantageous and useful for this purpose. Therefore, in accordance with yet another feature of the invention, there is provided a lambda sensor disposed in the loop.

In accordance with yet a further feature of the invention, there is provided a at least one thermocouple disposed in the loop.

In accordance with yet an added feature of the invention, the component is another catalytically active element.

An essential field of application of the invention is the heating of catalytically active elements, in particular the heating of exhaust gas catalysts in exhaust systems of motor vehicles before the combustion engine is started up.

Therefore, in accordance with yet an additional feature of the invention, part of the gas carrying system is part of an exhaust system for a motor vehicle, and the other catalytically active element is an exhaust gas catalyst in the exhaust system.

In accordance with again another feature of the invention, there is provided an exhaust pipe segment in which the other catalytically active element is disposed, the exhaust pipe segment having inlets disposed on both sides of the other catalytically active element, and a bypass line through which the inlets communicate with one another, the loop being formed by the exhaust pipe segment and the bypass line.

In accordance with again a further feature of the invention, there is provided a controllable flap for closing at least one of the inlets.

It is known to electrically heat exhaust gas catalysts that have metal carrier bodies, but this is usefully applicable only to special carrier bodies that are optimized in terms of their electrical resistance. In order to attain useful preheating, the carrier body must be acted upon by outputs of 1 kW and above, yet it is only very limitedly possible to achieve such outputs with the electrical system of a motor vehicle. Moreover, the electric resistance of a metal carrier body of conventional construction is only a few hundredths of an ohm, depending on its size. This is disadvantageous for electric heating in view of the resistance losses in the delivery lines. The invention therefore makes it possible to heat an exhaust gas catalyst with the heat from a clean, safe combustion reaction, and thermal outputs of up to several kilowatts are readily possible. Optional electric heating applies only to the first catalytic element, which trips the heat-producing combustion reaction. As a rule, however, this first catalytic element is smaller than the exhaust gas catalyst, making the problem of low electrical resistance much less extensive, if it arises at all.

Moreover, the first catalytic element is not subjected to the thermal and mechanical strains of the exhaust gas catalyst, which is acted upon by a pulsating flow of exhaust gas. Accordingly, it does not need to be calibrated to maximum loading capacity, so that a great number of engineering possibilities are available to increase the electrical resistance.

Another field in which the invention may be employed is to furnish heat for heating purposes, particularly for heating motor vehicles. At least one component serving to absorb heat in the apparatus according to the invention is a heat exchanger.

In accordance with again an added feature of the invention, the component is a heat exchanger having at least one hot conduit through which the gas flow can flow and at least one cold conduit through which a heat transfer fluid can flow.

In accordance with again an additional feature of the invention, the heat transfer fluid is a gas, in particular air.

In accordance with still another feature of the invention, the at least one cold conduit is part of an air-heating system, in particular in a motor vehicle.

In accordance with still a further feature of the invention, the heat transfer fluid is a liquid, particularly water.

In accordance with still an added feature of the invention, the at least one cold conduit is part of a coolant system in a motor vehicle.

In accordance with still an additional feature of the invention, the heat exchanger has the catalytically active element.

In accordance with another feature of the invention, the at least one hot conduit has a wall oriented toward the gas flow, for receiving a catalytically active layer.

Therefore, the heat exchanger has both a conduit system for carrying the gas flow and a conduit system for carrying a heat transfer fluid, in particular air or water. During operation of the apparatus, the heat transfer fluid is transported through the heat exchanger by an external or internal feed device, in the course of which it heats up and then accomplishes the desired heating purpose.

Both air and water are possible as the heat transfer fluid. It is especially possible in the case of motor vehicle heating for the coolant system to be integrated. In the latter case, preheating of the engine before it is started is possible simultaneously with the heating of the passenger compartment.

Regardless of other embodiments, one particularly advantageous further feature of the apparatus according to the invention with a heat exchanger relates to the heat exchanger carrying the first catalytic element that trips the combustion reaction, in particular carrying it in such a way that the line system of the heat exchanger that carries the gas flow has walls that have catalytically effective layers past which the gas flow sweeps (the option of the presence of a further first catalytically active element should not be precluded). An apparatus that is equipped in this way has a very short transfer path for the heat of combustion. The heat transfer takes place at high efficiency and with particularly low losses, and a particularly compact structure for the apparatus is attainable.

As already mentioned, heat-absorbing components can be disposed in the apparatus according to the invention both in the gas carrying system forming the loop and in the gas outlet.

In accordance with a further feature of the invention, the heat exchanger is a first heat exchanger accommodated in the loop, and including a second heat exchanger accommodated in the gas outlet.

In accordance with a concomitant feature of the invention, the second heat exchanger has at least one hot conduit through which the gas flow can flow and at least one cold conduit through which a heat transfer fluid can flow, and the at least one cold conduit of the first heat exchanger communicates with the at least one cold conduit of the second heat exchanger.

A corresponding and especially important further advantage is attained as explained above, namely by placing one heat exchanger each in the loop and in the gas outlet. Preferably, the communication between the conduit systems of the heat exchangers carrying the heat transfer fluid is in series. This kind of apparatus furnishes a relatively severely cooled exhaust gas from the gas outlet and is therefore especially advantageous for use in heat-sensitive surroundings or surroundings that must be protected against excessive heat, such as the passenger compartments of motor vehicles.

Other features which are considered as characteristic for the invention are set forth in the appended claims.

Although the invention is illustrated and described herein as embodied in a method and apparatus for generating heat by flameless combustion of a fuel in a gas flow, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

The invention will now be described in further detail in terms of exemplary embodiments that are diagrammatically and schematically shown in the drawing. The figures of the drawing show apparatuses for generating heat by flameless combustion of a fuel in a gas flow carried in a loop and the introduction of this heat into a component.

Figure 1:
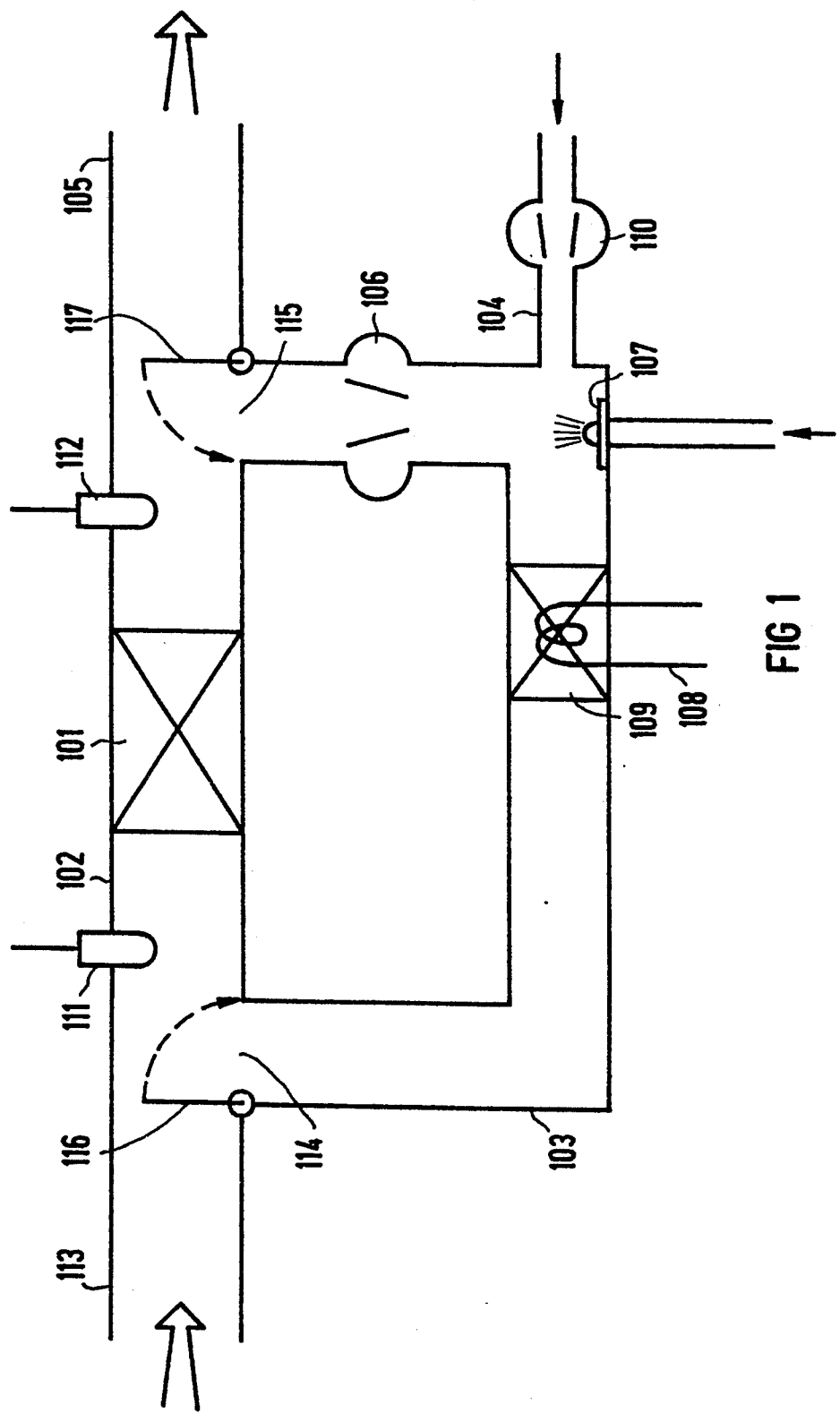
FIG. 1 is a diagrammatic and schematic view of an apparatus for heating an exhaust gas catalyst in a motor vehicle.
Figure 2:
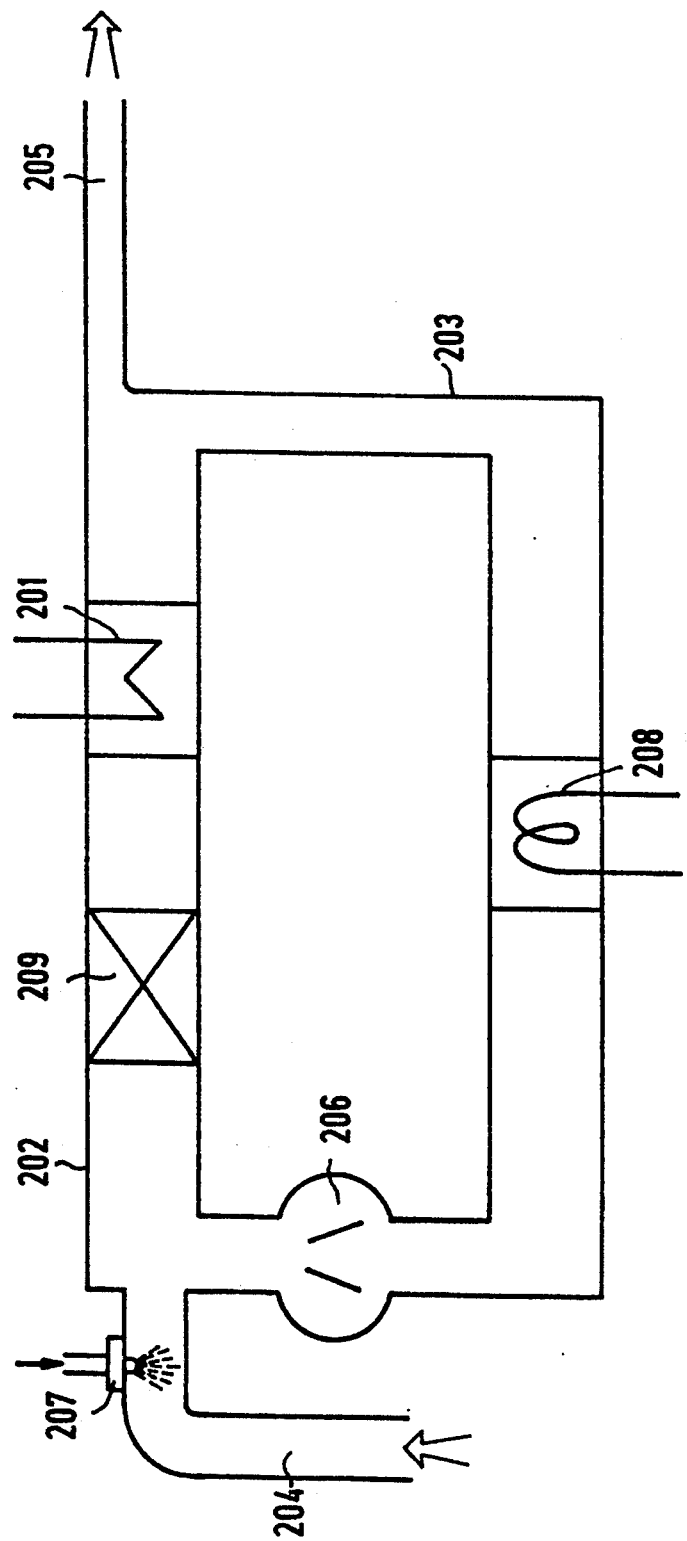
FIG. 2 is a view similar to FIG. 1 of an apparatus for removing heat produced in the combustion by means of a heat exchanger.
Figure 3:
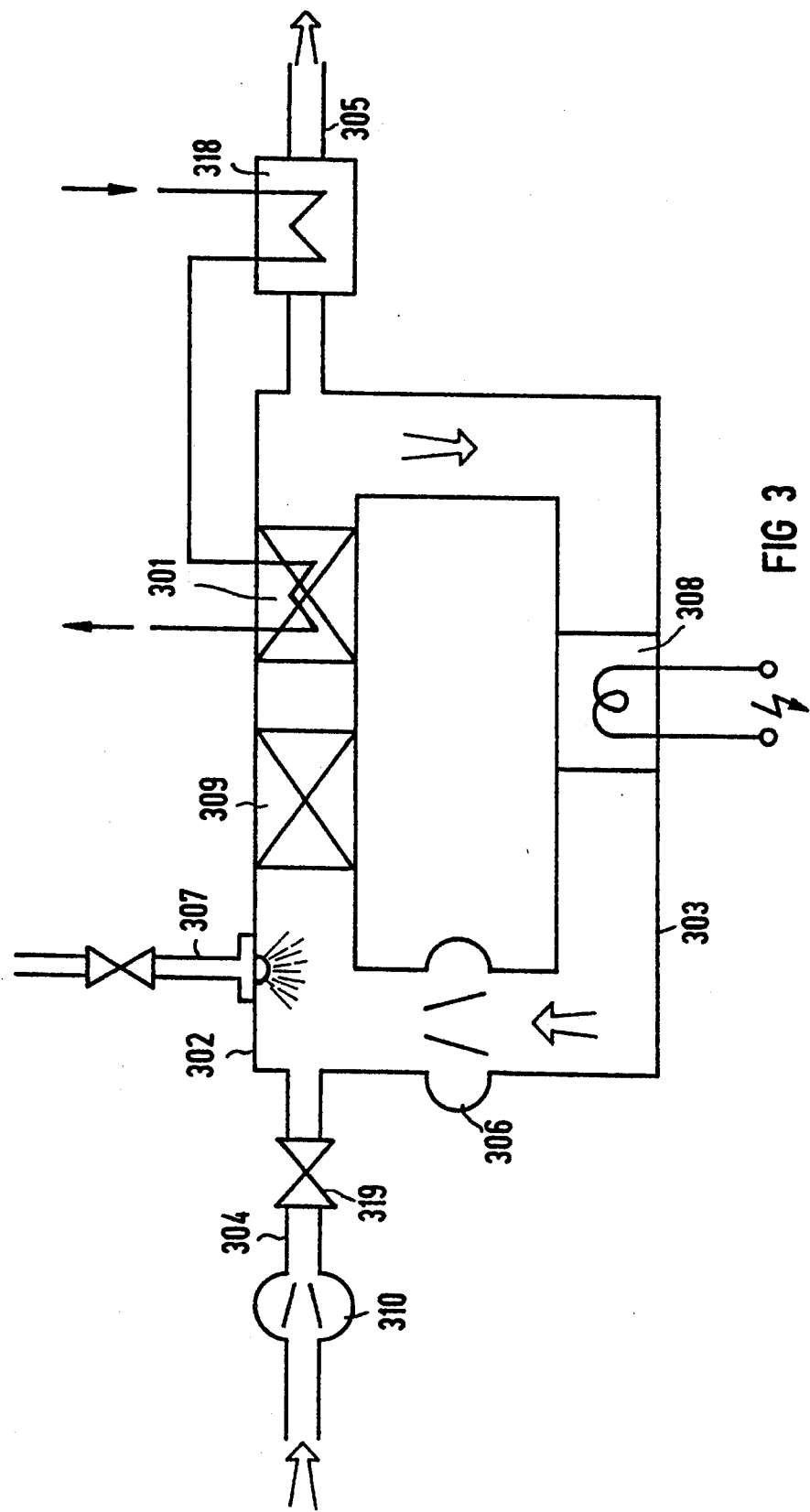
FIG. 3 is a view of an apparatus similar to the apparatus shown in FIG. 2, which is especially suitable, for instance, as an auxiliary or supplementary heater in a motor vehicle.

Referring now to all three figures of the drawing simultaneously in order to describe the details which are essential to the invention, it is seen that reference numerals 101-117 apply to FIG. 1, reference numerals 201-209 apply to FIG. 2, and reference numerals 301-319 apply to FIG. 3. In each case, the apparatus according to the invention has a gas carrying system 102, 202, 302, which includes tubular lines or the like and serves to carry the gas flow or current. The gas carrying system 102, 202, 302 has at least one loop 103, 203, 303, in which the gas flow can be made to circulate. Fresh gas with an oxygen content, particularly air, can be delivered to the gas flow circulating in the loop 103, 203, 303 through a gas inlet 104, 204, 304. A certain proportion of the circulating gas flow can be discharged through a gas outlet 105, 205, 305. While the discharging of gas can take place substantially passively, for instance by constructing the gas outlet 105, 205, 305 as an elongated tube with a hydraulic cross section that is substantially smaller than the mean hydraulic cross section of a pipe system forming the loop 103, 203, 303, the feeding of the gas should take place actively, through suitable feed means.

The circulation of the gas flow in the loop 103, 203, 303 is effected by a first feed device 106, 206, 306, in particular a blower, which is disposed in the part of the gas carrying system 102, 202, 302 forming the loop 103, 203, 303. In order to deliver fuel into the gas flow, the loop 103, 203, 303 contains a suitable delivery device 107, 207, 307, namely a nozzle or nozzle configuration having a suitable fuel delivery system. According to the invention, the combustion of the fuel takes place in a flameless, catalytically effective manner. To this end, the loop 103, 203, 303 has a first catalytically active element 109, 209, 309, in particular a honeycomb body through which the gas flow can flow. The honeycomb body has a plurality of conduits that have a coating of a catalytic material (platinum, rhodium or the like) on walls thereof facing the gas flow. As is well known, combustion in the catalytically active element 109, 209, 309 does not ensue until the temperature of the gas flow sweeping past the catalytic material exceeds the activation temperature of the catalyst. Accordingly, a heating device 108, 208, 308 is provided in the loop 103, 203, 303. This heating device 108, 208, 308 may be a heat conductor configuration that can be acted upon by an electric current, but it may also be constructed as a normal burner or as a heat exchanger, depending on the application. Finally, each apparatus that is shown has at least one component 101, 201, 301, 318, into which the heat produced in the flameless combustion in the circulating gas flow is to be introduced. Exemplary embodiments will be described further below in the context of the descriptions of the individual figures of the drawing.

FIG. 1 diagrammatically shows the application of the invention in the context of an apparatus for heating an exhaust gas catalyst in an exhaust system of a motor vehicle. The exhaust gas catalyst in Fig- 1 is the component 101 that is to be acted upon by the heat produced by flameless combustion of the fuel in the circulating gas flow and is to be heated by that heat. The gas carrying system 102 is formed of an exhaust pipe segment 113, in which the exhaust gas catalyst 101 is disposed. As viewed in the direction of the exhaust gas flow, the exhaust pipe segment 113 has one inlet 114 disposed upstream and one inlet 115 disposed downstream of the exhaust gas catalyst 101. The inlets 114, 115 are joined to one another through a bypass line, so that the loop 103 is formed of the exhaust pipe segment 113 located between the inlets 114, 115 and the bypass line. The bypass line can be connected to the two inlets 114, 115 by means of flaps 116, 117, which may be useful with regard to the strain on the apparatus when it is acted upon by an exhaust gas, in order to protect the devices located in the bypass line. The flaps 116, 117 are not fundamentally necessary, since they serve less to assure satisfactory function of the apparatus according to the invention than to protect the devices located in the bypass line. Integrated into the gas carrying system 102 are a lambda sensor 111 and a thermocouple 112. As a rule, the exhaust gas catalyst 101 already has a lambda sensor 111 assigned to it, and it is recommended that it also be used during operation of the apparatus according to the invention in order to regulate the flameless combustion. The thermocouple 112 may also serve as a functional control for the exhaust gas catalyst 101 when the exhaust gas catalyst 101 is acted upon by exhaust gas. In the context of the invention, the thermocouple 112 is helpful in determining the temperature of the exhaust gas catalyst 101 to be heated. As already suggested, the first feed device 106, the delivery device 107, the heating device 108 and the first catalytically active element 109 are accommodated in the bypass line that joins the inlets 114, 115 to one another. Moreover, the gas inlet 104 discharges into the bypass line. In the example shown, the gas outlet 105 is the exhaust gas line that directly discharges into the open air. A second feed device 110 for delivering fresh air is additionally provided in the gas inlet 104. In the context of providing an advantageous embodiment of the invention, the heating device 108 is also combined with the first catalytically active element 109. In specific terms this can be accomplished, for instance, by using a metal honeycomb body as the carrier of the catalytically active layer, through which an electric current can flow and which can thereby be heated. This is a particularly good choice, because it already assures the onset of the catalytic reaction after only a brief activation time of the apparatus according to the invention. Heating of the first catalytically active element 109 furthermore has the advantage of permitting the catalytic reaction to be stabilized, as long as the temperature of the circulating gas flow is still below the necessary activation temperature. In the illustrated embodiment, the delivery device 107 for the fuel is located in the bypass line between the gas inlet 104 and the heating device 108. The positioning of the delivery device 107 in the loop 103 is relatively uncritical. However, in the present example, providing the delivery device 107 directly in the exhaust pipe segment 113 should naturally be avoided. Means for feeding the fuel are not shown in FIG. 1, because their use is familiar to one skilled in the art.

FIG. 2 shows an apparatus in which the component 201 to be acted upon by the heat produced in the combustion is a heat exchanger for heating a heat transfer fluid such as air or water, for instance, for use in the context of a heating system, in particular a portable or mobile heating system in the form of an auxiliary or supplementary heater for a motor vehicle. As a special feature, in FIG. 2 the delivery device 207 for the fuel is not included directly in the loop 203 but rather it is in the gas inlet 204. In that case, fuel can only be delivered to the gas flow circulating in the loop 203 together with fresh air which requires a non-illustrated feed device. This has the advantage of precluding the appearance of an oxygen deficit in the circulating gas flow, which otherwise would be possible only by means of a careful monitoring of the combustion process. The gas outlet 205 is shown as a relatively long line with a small hydraulic cross section. The length of the line prevents gas from the gas flow from being spun uncontrollably into the open air through the gas outlet. However, a pressure increase in the loop 203 is reliably precluded because there are no closing devices in the gas outlet 205. It is understood that it is possible to provide closing devices such as valves and the like in the gas outlet 205, if necessary.

FIG. 3 shows another embodiment of the apparatus according to the invention for transferring the heat produced in the combustion process, to a heat transfer fluid. The transfer in the present case takes place in the components which are first and second series-connected heat exchangers 301, 318. The first heat exchanger 301 is disposed directly in the loop 303, and the second heat exchanger 318 is located in the gas outlet 305. The first and second heat exchangers each have at least one hot conduit through which the gas flow can flow and at least one cold conduit through which a heat transfer fluid can flow. The at least one cold conduit of the first heat exchanger 301 communicates with the at least one cold conduit of the second heat exchanger 318. The most important function of the second heat exchanger 318 is cooling of the exhaust gas discharged through the gas outlet 305, which may be useful, for instance, in an auxiliary motor vehicle heater intended to be disposed in the passenger compartment of a motor vehicle. As a special feature, the first heat exchanger 301 develops a certain catalytic effect, for instance due to the fact that the conduits or channels of the heat exchanger 301 through which the gas flow or current can flow, have a catalytically effective coating on the walls thereof. Under some circumstances, the first heat exchanger 301 may completely take over the function of the first catalytically active element 309, which is advantageous with a view toward providing the most compact possible embodiment of the apparatus. The heating device 308 is advantageously operated with an electric current. The gas inlet 304 has not only a second feed device 310 which is required for feeding fresh gas, but also an inlet valve 319 that serves the purpose of fine regulation of the quantity of fresh gas delivered to the loop 303. The configuration shown should be considered representative of many possible embodiments.

We claim:

1. A method for generating heat by flameless combustion of a fuel in a gas flow having an oxygen content, which comprises:

a) passing a gas flow through at least one heating device, along at least one delivery device for fuel, and along at least one catalytically active element;

b) during a maintained operation of the heating device, passing a predominant part of the gas flow through a loop while passing through a feed apparatus and along the at least one catalytically active element for maintaining an adequate operating temperature during operation;

c) feeding a gas having an oxygen content into the loop, and discharging some of the gas flow from the loop; and d) admixing fuel with the gas flow only to such an extent that a resultant fuel-gas mixture is not itself ignitable during operation of the heating device.

2. The method according to claim 1, which comprises carrying the gas flow to an extent of approximately 70% to approximately 90% in the loop.

3. The method according to claim 1, which comprises initially heating the gas flow with the heating device at least as long as the temperature of the gas flow is below an activation temperature of the at least one catalytically active element.

4. The method according to claim 3, which comprises preventing gas from being fed into the loop as long as the gas flow is being heated.

5. The method according to claim 1, which comprises feeding gas into the loop only while ensuring that the temperature of the gas flow upon reaching the at least one catalytically active element is not below an activation temperature of the at least one catalytically active element.

6. The method according to claim 1, which comprises discharging some of the gas flow from the loop if the gas pressure in the loop exceeds a limit value.

7. The method according to claim 1, which comprises generating heat at a maximum thermal output of approximately 10 kilowatts.

8. The method according to claim 1, which comprises generating heat at a maximum thermal output of approximately 7 kilowatts.

9. The method according to claim 1, which comprises generating heat at a maximum thermal output of approximately 4 kilowatts.

10. The method according to claim 1, which comprises passing generated heat into at least one component around which the gas flow can flow.

11. The method according to claim 1, which comprises passing generated heat into at least one component through which the gas flow can flow.

12. The method according to claim 1, which comprises passing generated heat into at least one component around and through which the gas flow can flow.

13. An apparatus for introducing heat into a component, comprising:

a) a gas carrying system for conducting a gas flow carrying heat produced by flameless combustion of a fuel, said gas carrying system having at least one loop, a delivery device for delivering fuel, a gas inlet, a gas outlet, and means for causing a predominant part of the gas flow to flow through said at least one loop;

b) a component disposed in said loop for heat absorption from said gas flow flowing around and/or through said component, a feed device disposed in said loop for maintaining said gas flow in said loop, a heating device disposed in said loop, and a catalytically active element disposed in said loop;

wherein said component is another catalytically active element; and wherein part of said gas carrying system is part of an exhaust system for a motor vehicle, and said other catalytically active element is an exhaust gas catalyst in the exhaust system.

14. The apparatus according to claim 13, including another component disposed in said gas outlet for heat absorption.

15. The apparatus according to claim 13, wherein said catalytically active element is part of said heating device.

16. The apparatus according to claim 13, wherein said heating device includes a heat conductor configuration to be acted upon by an electric current.

17. The apparatus according to claim 13, wherein said gas inlet includes a second feed device for delivering gas to said gas flow.

18. The apparatus according to claim 13, including at least one lambda sensor disposed in said loop.

19. The apparatus according to claim 13, including at least one thermocouple disposed in said loop.

20. The apparatus according to claim 13, including an exhaust pipe segment in which said other catalytically active element is disposed, said exhaust pipe segment having inlets disposed on both sides of said other catalytically active element, and a bypass line through which said inlets communicate with one another, said loop being formed by said exhaust pipe segment and said bypass line.

21. The apparatus according to claim 20, including a controllable flap for closing at least one of the inlets.

22. The apparatus according to claim 13, wherein said component is a heat exchanger having at least one hot conduit through which said gas flow can flow and at least one cold conduit through which a heat transfer fluid can flow.

23. The apparatus according to claim 22, wherein the heat transfer fluid is a gas.

24. The apparatus according to claim 22, wherein the heat transfer fluid is air.

25. The apparatus according to claim 22, wherein said at least one cold conduit is part of an air-heating system.

26. The apparatus according to claim 22, wherein said at least one cold conduit is part of an air-heating system in a motor vehicle.

27. The apparatus according to claim 22, wherein the heat transfer fluid is a liquid.

28. The apparatus according to claim 22, wherein the heat transfer fluid is water.

29. The apparatus according to claim 27, wherein said at least one cold conduit is part of a coolant system in a motor vehicle.

30. The apparatus according to claim 22, wherein said heat exchanger has said catalytically active element.

31. An apparatus for introducing heat into a component, comprising:

a) a gas carrying system for conducting a gas flow carrying heat produced by flameless combustion of a fuel, said gas carrying system having at least one loop, a delivery device for delivering fuel, a gas inlet, a gas outlet, and means for causing a predominant part of the gas flow to flow through said at least one loop;

b) a component disposed in said loop for heat absorption from said gas flow flowing around and/or through said component, a feed device disposed in said loop for maintaining said gas flow in said loop, a heating device disposed in said loop, and a catalytically active element disposed in said loop;

wherein said component is a heat exchanger having at least one hot conduit through which said gas flow can flow and at least one cold conduit through which a heat transfer fluid can flow; and wherein said at least one hot conduit has a wall oriented toward said gas flow, for receiving a catalytically active layer.

32. An apparatus for introducing heat into a component, comprising:
a) a gas carrying system for conducting a gas flow carrying heat produced by flameless combustion of a fuel, said gas carrying system having at least one loop, a delivery device for delivering fuel, a gas inlet, a gas outlet, and means for causing a predominant part of the gas flow to flow through said at least one loop;
b) a component disposed in said loop for heat absorption from said gas flow flowing around and/or through said component, a feed device disposed in said loop for maintaining said gas flow in said loop, a heating device disposed in said loop, and a catalytically active element disposed in said loop;

wherein said component is a heat exchanger having at least one hot conduit through which said gas flow can flow and at least one cold conduit through which a heat transfer fluid can flow; and wherein said heat exchanger is a first heat exchanger accommodated in said loop, and including a second heat exchanger accommodated in said gas outlet.

33. The apparatus according to claim 32, wherein said second heat exchanger has at least one hot conduit through which said gas flow can flow and at least one cold conduit through which a heat transfer fluid can flow, and said at least one cold conduit of said first heat exchanger communicates with said at least one cold conduit of said second heat exchanger.

* * * * *